United States Patent [19]

Carlson et al.

[11] Patent Number: 5,251,472
[45] Date of Patent: Oct. 12, 1993

[54] HIGH PRESSURE PIPE SLEEVE FOR PRESSURE TESTING OF JOINT SEALS

[75] Inventors: Edward R. Carlson, New Fairfield; William J. Schrull, New Milford, both of Conn.

[73] Assignee: The Presray Corporation, Pawling, N.Y.

[21] Appl. No.: 912,499

[22] Filed: Jul. 13, 1992

[51] Int. Cl.⁵ .......................................... G01M 3/28
[52] U.S. Cl. ........................................ 73/46; 73/40
[58] Field of Search .............. 73/40.5 R, 49.1, 49.5, 73/46, 49.8

[56] References Cited

U.S. PATENT DOCUMENTS

| | | | |
|---|---|---|---|
| 2,817,230 | 12/1957 | McCully | 73/46 |
| 3,731,525 | 5/1973 | Suter | 73/49.5 |
| 4,194,389 | 3/1980 | Laging | 73/49.5 |
| 4,624,131 | 11/1986 | Holm et al. | 73/49.1 |
| 4,727,749 | 3/1988 | Miller et al. | 73/49.1 |

OTHER PUBLICATIONS

1991 Catalog of The Presray Corporation "Pneuma--Seal", p. 12.

Primary Examiner—Hezron E. Williams
Assistant Examiner—Helen C. Kwok
Attorney, Agent, or Firm—Schweitzer Cornman & Gross

[57] ABSTRACT

An apparatus for pressure testing a penetration seal between a process pipe and surrounding penetration sleeve of larger diameter, where the process pipe passes through the wall of a containment structure. A wrap-around elastomeric boot connects the penetration sleeve with the process pipe and defines a chamber communicating with the penetration seal to be tested. Inner and outer collar sets, each formed of an opposed pair of semi-cylindrical collar segments, are mounted over the process pipe and penetration sleeve and secured together in surrounding relation to the elastomeric boot. Wrap-around, pneumatically inflatable clamping rings are interposed between the respective collar sets and the ends of the elastomeric boot, to tightly and sealingly clamp the boot to the process pipe and penetration sleeve. Pressurizing valves are provided on the clamping rings and on the elastomeric boot to enable periodic testing of the penetration seal by first pressurizing the clamping rings and thereafter pressurizing the sealed chamber formed by the elastomeric boot.

12 Claims, 3 Drawing Sheets 5,251,472

HIGH PRESSURE PIPE SLEEVE FOR PRESSURE TESTING OF JOINT SEALS

BACKGROUND AND SUMMARY OF THE INVENTION

In many process industries, such as chemical plants, nuclear generator facilities, etc., it is necessary for process piping to pass through the walls of containment structures. Where it is important to prevent the escape of toxic fumes, radioactive gases or the like, steps are taken to provide caulking or sealing means between the wall of the containment structure and the outer wall of the pipe. Routinely, such seals, hereinafter referred to as penetration seals, must accommodate some relative movement between the pipe and the containment structure, to allow for expansion and contraction. The seals provided for this purpose are known and do not form part of this invention.

To ensure the integrity of the penetration seal, it is desirable from time to time to test the seal by placing it under relative pressure from one side of the containment structure to confirm the absence of leakage flow. This is a fairly simple procedure where the joint is designed to withstand only relatively low pressures. However, when the joint must stand relatively high pressures, the testing procedure becomes more complex and difficult, because the testing equipment itself must be built to withstand the test pressures employed.

In accordance with the present invention, a novel sleeve structure is provided, which enables a pressure containment chamber to be provided at the area of penetration of the pipe through the wall of the containment structure. The pressure containment chamber enables the requisite high pressures to be imposed upon the penetration seal, in order to establish its integrity.

Inasmuch as the need or desire for integrity testing of the penetration seals generally arises after completion of the structure, it is frequently necessary to install the pressure containment chamber after installation of the piping. One of the significant aspects of the present invention, is the design and construction of a high pressure pipe sleeve arrangement which can be installed about the process piping after installation thereof and which provides a highly effective, economical structure for the containment of relatively high pressures, so that the ability of the penetration joint to withstand such pressures with integrity can be established.

Pursuant to the invention, inner and outer collar assemblies are provided for mounting respectively on the process piping on a penetration sleeve which surrounds the piping and forms the access opening through the wall of the containment structure. The respective collar assemblies are adapted to lockingly interfit with each other so as to define and annular wall spanning the annular region between the process piping and the penetration sleeve. Because of expected eccentricities between the axis of the process pipe and the axis of the penetration sleeve, the interfitting relationship of the inner and outer collar assemblies is itself designed to accommodate eccentric positioning of the central axis of the respective assemblies.

The interlocking collar assemblies form, together with the process pipe and penetration sleeve, a containment housing, which is closed at one side by the penetration seal to be tested. An elastomeric collar, designed for wrap-around field installation at the penetration joint, extends from a projecting end of the penetration sleeve to and into close fitting contact with the outer wall of the process pipe. At each end, the elastomeric sleeve is engaged by inflatable clamping rings, which surround the ends of the elastomeric boot and serve to tightly clamp the boot at each end to the process pipe or penetration sleeve, as the case may be. The inflatable clamping rings are contained on the outside by cylindrical wall portions of the respective collar assemblies. Accordingly, when the rings are inflated, they expand inwardly, tightly sealing the opposite axial ends of the elastomeric boot. Surrounding cylindrical walls of the collar assemblies serve, together with the interlocking annular end wall portions, to provide direct support for the elastomeric boot, in the region between the clamped ends thereof.

Pursuant to the invention, the collar assemblies are provided in segments, preferably semi-circular, which are applied over the process pipe and penetration sleeve from opposite sides and then secured together to form a continuous annular housing sleeve. After being mounted in position, the collar assemblies are securely bolted together.

Pneumatic pressurizing valves are provided for each of the clamping rings, to enable them to be pressurized after the sleeve parts are secured in position. Likewise, a pneumatic pressurizing valve is provided in the elastomeric boot, which projects out through the sidewall of the surrounding sleeve, enabling the chamber, enclosed by the elastomeric boot, to be subjected to a substantial pneumatic pressure, in order to test the penetration seal. The elastomeric boot is formed with a bellows-like convolution formed in a radial end wall, which extends from the process pipe outward to the diameter of the penetration sleeve. This convolution accommodates any eccentric relationship of the center line of the process pipe with respect to that of the penetration sleeve without undesirably stressing the material of the boot.

For a more complete understanding of the above and other features and advantages of the invention, reference should be made to the following detailed description of a preferred embodiment and to the accompanying drawings.

DESCRIPTION OF A PREFERRED EMBODIMENT

Figure 1:
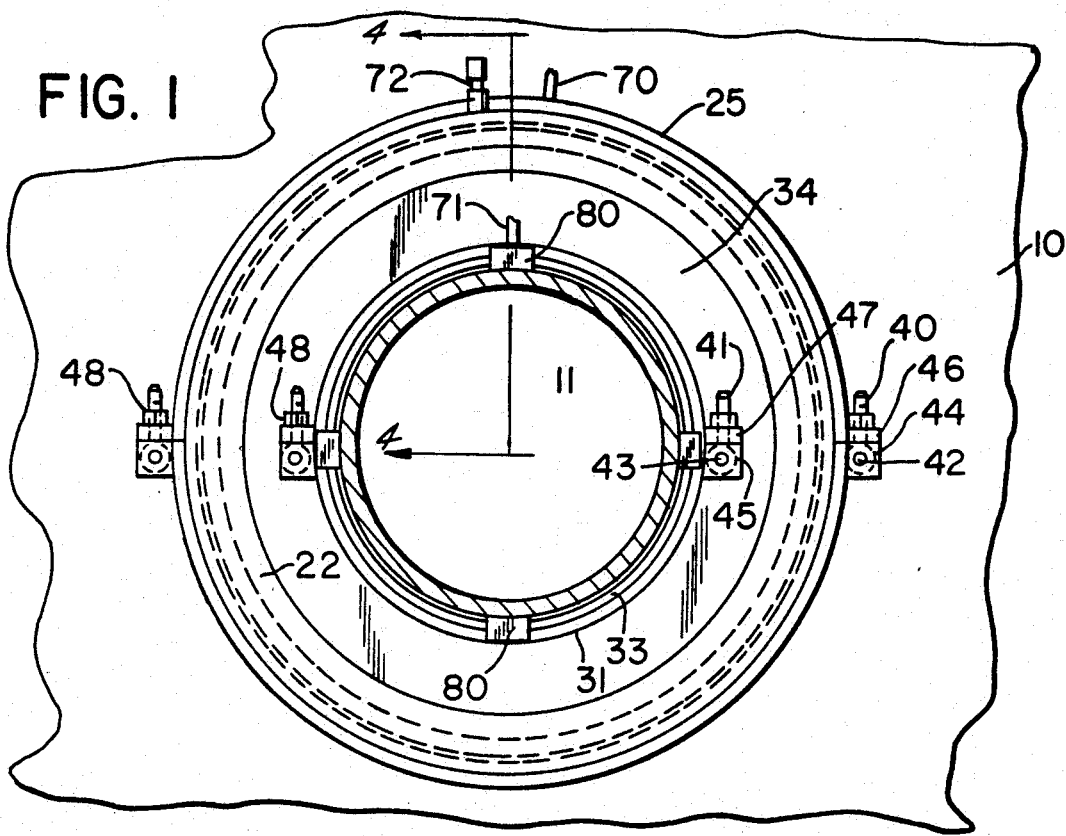
FIG. 1 is a front elevational view illustrating the high pressure pipe sleeve arrangement of the invention as typically mounted on a process pipe.
Figure 2:
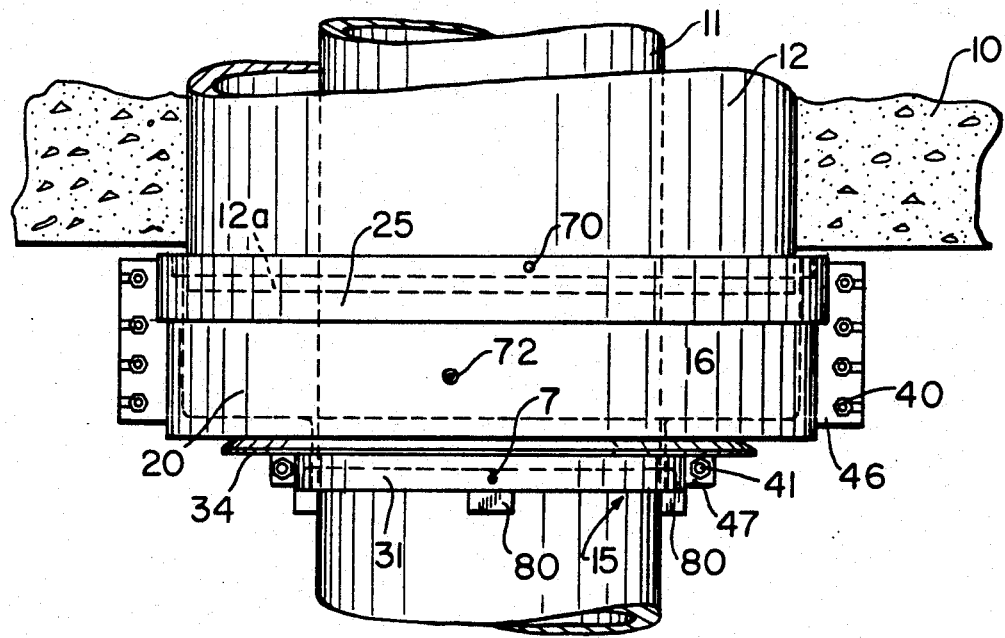
FIG. 2 is a top plan view, partly in section, of the installation of FIG. 1.

Referring now to the drawing, the reference numeral 10 designates the wall of a primary containment structure. A process pipe 11 is arranged to pass through the wall 10 in a generally known manner. The process pipe 11 may contain steam, gases, liquids, etc. depending on the process operations. Typically, a penetration sleeve 12 of cylindrical form is fixed in the wall 10 for the passage of the process pipe 11 and has a short portion 12a projecting beyond the outer face of the wall. Pursuant to known practices, forming no part of the present invention, a suitable caulking or seal is formed between the inner wall of the penetration sleeve 12 and the outer wall of the process pipe 11. For illustrative purposes only, such a seal, referred to herein as the penetration seal, is schematically represented at 13 in FIG. 4. A typical function of the penetration seal 13 is to enable the containment structure to contain escaping gases or the like and prevent their passage through the space between the process pipe 11 and the penetration sleeve 12.

As will be understood, there typically is a certain amount of movement between the process pipe 11 and the penetration sleeve 12 resulting from normal expansion and contraction, stress loadings, etc. Accordingly, for these and other reasons, it is important periodically to test the integrity of the penetration seal 13.

Pursuant to the invention, the integrity of the penetration seal is tested by forming a sealed, pressurizable chamber 19 about the annular space 14 (FIG. 4), subsequently pressurizing the chamber, and testing for leakage at the penetration seal 13. A housing for defining the sealed chamber 19 is formed utilizing opposed pairs of generally semi-cylindrical collar sets, generally designated by the reference numerals 15, 16 which respectively surround and grip the process pipe 11 and the penetration sleeve 12, respectively and interlock with each other to form an annular end wall 17. As will be described in greater detail, an elastomeric boot 18 is gripped and supported by the collar sets 15, 16 and forms a seal extending between the penetration sleeve 12 and the process pipe 11. The boot 18 encloses the chamber 19, which then can be placed at a substantial positive pressure in order to test the integrity of the penetration seal.

The outer collar set 16 comprises a pair of opposed, semi-cylindrical walls 20 having an inside radius slightly greater than the outside radius of the penetration sleeve 12. At their outer edges 21, the walls 20 are rigidly joined to radially inwardly extending end wall panels 22 of arcuate form. An opposed pair of end wall panels 22 form an annular end wall arranged to surround the process pipe 11. The inner edges 23 of the end wall panels 22 have a radius substantially larger than that of the process pipe 11 so that, when the outer collar set 16 is in place around the penetration sleeve 12, there is a substantial annular space between the process pipe and the annular edge 23 to accommodate eccentricity between the pipe 11 and the sleeve 12. To advantage, the inner edges of the end wall panels 22 are bevelled at 24 to facilitate assembly with the inner collar set 15, as will appear.

Adjacent its inner edge, the semi-cylindrical wall 20 has secured thereto, advantageously by welding, a surrounding, semi-cylindrical strip 25. The inner end portion 26 of the strip 25 projects beyond the inner end portion 27 of the semi-cylindrical wall 20 to form a semi-annular recess 28 for the reception of an annular inflatable clamping ring 29, shown in FIG. 4 in an inflated/expanded condition.

The inner collar set 15 comprises opposed semi-cylindrical walls 30, having an inside radius slightly greater than the outside radius of the process pipe 11 so as to closely surround the outer wall of the pipe. Semi-cylindrical straps 31 surround the outer end portions of the walls 30 and project beyond, to form semi-annular chambers 32 for the reception of an inflatable clamping ring 33, shown in FIG. 4 in an inflated expanded condition.

Figure 4:
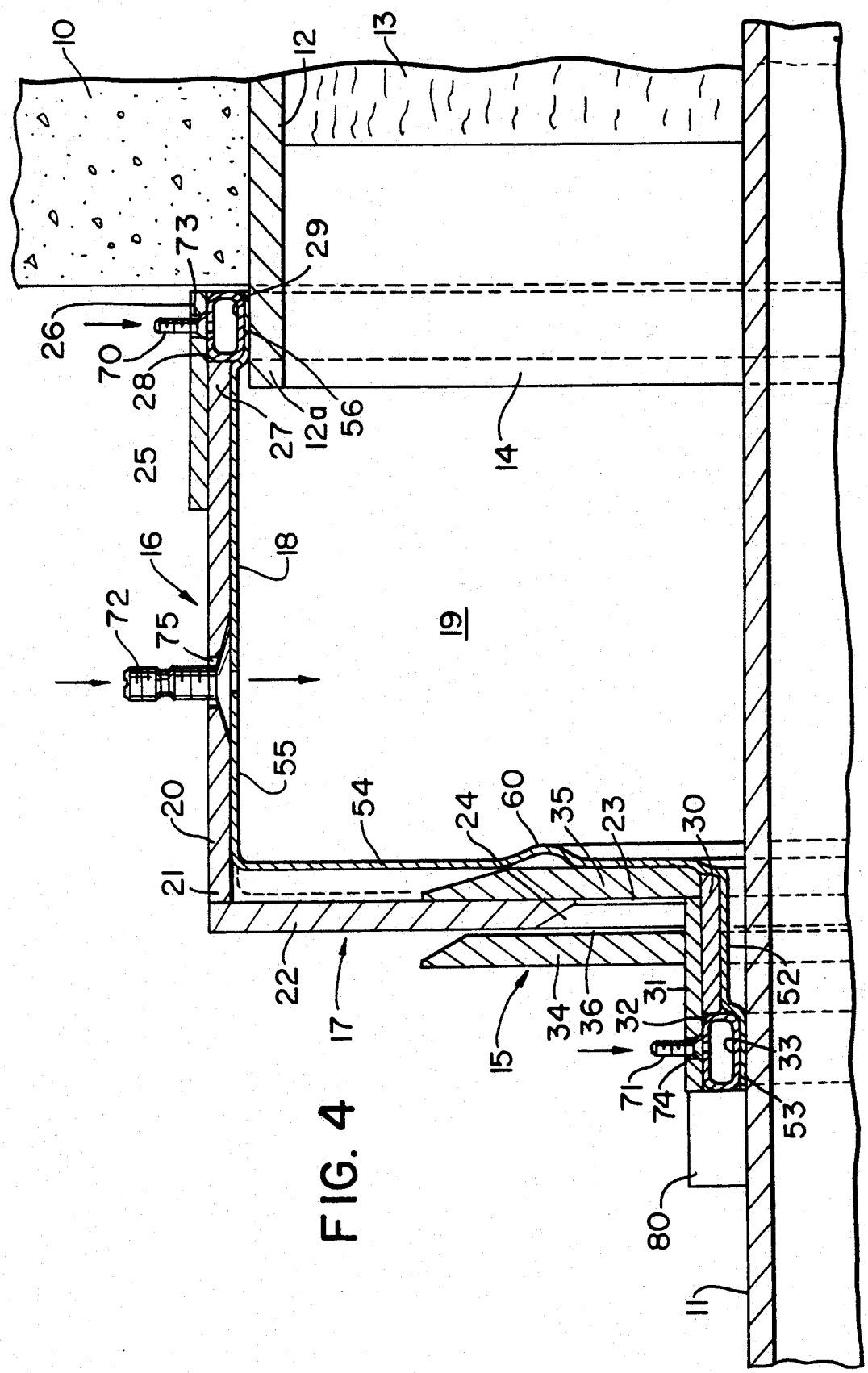
FIG. 4 is an enlarged, fragmentary, cross sectional view as taken generally on line 4—4 of FIG. 1.

To advantage, a pair of spaced-apart, radially outwardly extending semi-annular end wall panels 34, 35, defining a radial space 36 between them, are mounted on the strip 31 and wall 30, respectively. The radial space 36 is arranged to receive the radially inner edge margins of the arcuate panels 22 of the outer collar sets 16, as shown in FIG. 4. The radial dimensions of the wall panels 34, 35 are such as to establish an overlapping relationship between the wall panels 34, 35 of the inner collar set and the wall panels 22 of the outer collar set 16. The arrangement is such that, when both collar sets are installed as shown in FIG. 4, there is always some overlap, and thus an axially interlocking relationship, between the inner and outer collar sets, regardless of expected eccentricities in the axis of the process pipe 11 and penetration sleeve 12. To advantage, the wall panel 34 is provided with a bevelled outer edge 34a, arranged to cooperate with the bevelled edge 24 of panels 22, to facilitate interfitting of the parts during installation.

Because the process pipe typically is in place prior to installation of the pressure testing assembly, the collar sets 15, 16 are separated into their semi-cylindrical sections and applied separately around the process pipe 11. The two sets are then secured tightly together by means of bolts 40, for the outer collar sets, and 41, for the inner collar set 15. Desirably, the bolts 40, 41 may be in the form of eye bolts pivotally held by pins 42, 43 secured in slotted blocks 44, 45. The blocks 44, 45 are rigidly mounted on the lower semi-cylindrical section of each of the collar sets, while mating slotted lugs 46, 47 are mounted on the respective upper collar halves, as shown in FIG. 1. To enable assembly of the collar set, nuts 48 on the several eye bolts 40, 41 are loosened sufficiently to enable the eye bolts to be pivoted outwardly and downwardly. The semi-cylindrical halves of the collar sets are then individually assembled, the inner collar set first and then the outer collar set. After joining of the two halves of the inner collar set, the bolts 41 are pivoted upwardly and the respective nuts 48 tightened. The outer collar set 16 is then assembled in a similar manner, with the semi-annular end wall panels 22 being received between the respective end wall panels 34, 35 of the inner collar set, as shown in FIG. 4. The several eye bolts 40 are then pivoted up into locking position in their respective nuts tightened to locking position and their respective nuts tightened down.

Prior to mounting of the collar sets 15, 16, the elastic boot 18 and the inflatable clamping rings 29, 33 are installed in place. The elastomeric boot 18 is a premolded annular member, having a cross section substantially as indicated in FIG. 4. Instead of being molded as an annulus, however, the boot 18 is molded in a discontinuous annular form, with overlapping end portions, as indicated at 50, 51 in FIG. 3. As shown particularly in FIGS. 3 and 4, the elastomeric boot includes a neck portion 52, which underlies the wall portions 30 of the inner collar set, and an inner clamping section 53 positioned to underlie the inflatable clamping ring 33.

A generally radially extending annular wall 54 of the boot 18 extends from the neck 52 to an outer annular wall portion 55. The latter terminates at an annular clamping portion 56 arranged to underlie the inflatable clamping ring 29. To particular advantage, the radial wall portion 54 of the elastomeric boot is formed with one or more ridges or convolutions 60 in an intermediate annular portion thereof, so that expected eccentricities of the process pipe and penetration sleeve may be accommodated without stressing the material of the elastomeric boot 18 in tension.

Figure 3:
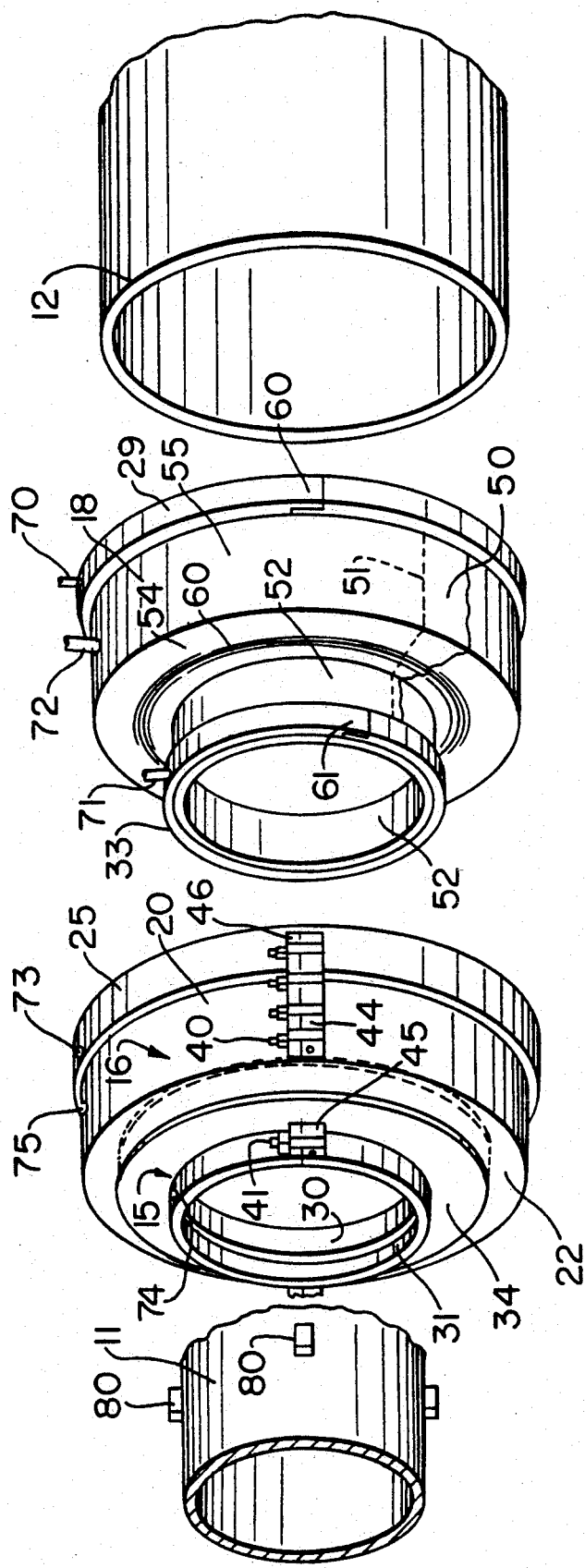
FIG. 3 is a simplified, exploded representation of the assembly of FIGS. 1 and 2.

To install the elastomeric boot 18, the respective ends 50, 51 thereof are separated widely enough to allow the boot to be wrapped around the process pipe 11 and penetration sleeve 12, substantially as indicated in FIGS. 4 and 3. When the boot is properly positioned, its ends 50, 51 will overlap in the manner shown in FIG. 3, and these overlapping ends are bonded together with suitable adhesive, forming an airtight bond along the full axial length of the overlapping portion.

In the illustrated form of the invention, the respective inflatable clamping rings 29, 33 are formed of a suitable length to be wrapped snugly around the outside of the process pipe or penetration sleeve, as the case may be, in a position to overlie the end margins 53, 56 of the elastomeric boot. The respective clamping rings are hollow substantially throughout their length but closed at each end. The length is slightly greater than the circumference about which the rings are applied, providing for at least some degree of overlap, as reflected at 60, 61 in FIG. 3. Desirably, the opposite ends of the inflatable rings are stepped or tapered, as illustrated in FIG. 3, so that the outside diameter of the clamping rings does not change significantly in the overlap area.

The clamping rings 29, 33 are installed after installation of the boot 18 and are installed by being wrapped circumferentially around end margins of the boot overlying the penetration sleeve and process pipe respectively. Suitable adhesive is applied to the overlapping portions 60, 61 of the clamping rings to bond them in annular form. If desired, adhesive may be applied between the inner surfaces of the clamping rings and the outer surfaces of the underlying boot margins 53, 56.

As shown in FIGS. 3 and 4, pressurizing valves 70, 71 are provided in the respective clamping rings 29, 33, and a similar pressurizing valve 72 is provided on the elastomeric boot 18. Suitable openings 73, 74 are provided in the semi-cylindrical strips 25, 31, to accommodate the stems of the pressurizing valves 70, 71, and an opening 75 is formed in the semi-cylindrical wall 20, to accommodate the pressurizing valve 72.

After installing the boot 18 and clamping rings 29, 33, the respective collar sets 15, 16 are applied over the process pipe in the manner previously described, providing external support for the boot and the clamping rings. After securing the collar sets, by means of the eye bolts 40, 41, the respective clamping rings 29, 33 are inflated, to tightly clamp and seal the opposite ends of the boot 18. Thereafter, the chamber 19 is pressurized via the pressurizing valve 72. Initially, the elastomeric boot 18 is inflated and pressed tightly against the various walls defining the chamber. Thereafter, as pressure builds up to the desired test level, the boot is supported and confined by walls of the installed collar sets. The rate at which the pressure subsequently falls determines the leakage, if any, at the penetration seal 13 in the manner desired.

When the chamber 19 is pressurized substantially above ambient, there is significant unbalanced pressure acting on the annular wall 17, tending to force the entire assembly to the left, as viewed in FIG. 4. This is prevented by providing positive mechanical stop blocks 80 around the circumference of the process pipe, adjacent the outer end of the inner collar set 15. Suitably, four such blocks may be welded to the outer surface of the process pipe 11. These blocks abut the outer end of the semi-cylindrical strip 31, positively preventing leftward motion of the inner collar set 15. The outer collar set in turn is constrained by the interlocking relationship of the annular wall 22 to the spaced apart annular wall panels 34, 35.

When the test has been completed, the pressure within the clamping rings 29, 33 and within the chamber 19 can be released through the respective pressurizing valves 70-72. Typically, the installation is left in place until the next time scheduled for periodically testing the penetration seal.

The invention provides an economical, easy-to-install system enabling the application of relatively high levels of test pressure to penetration seals. The system is suitable for installation subsequent to the original construction, and readily accommodates the positional variations to be expected in the location of the process pipe in relation to the surrounding penetration sleeve. Once installed, the apparatus may be left in place and periodically visited for pressurization testing.

It should be understood, of course, that the specific form of the invention herein illustrated and described is intended to be representative only, as certain changes may be made therein without departing from the clear teachings of the disclosure. Accordingly, reference should be made to the following appended claims in determining the full scope of the invention.

We claim:

1. An apparatus for pressure testing a penetration seal between a process pipe and a surrounding penetration sleeve of larger diameter than said process pipe, which comprises
    (a) an elastomeric boot of annular configuration positioned around said process pipe,
    (b) said boot having a first portion closely surrounding said process pipe, a second portion closely surrounding a portion of said penetration sleeve, and a third portion joining said first and second portions to form a pressurizable chamber exposed to said penetration seal,
    (c) a first collar set closely surrounding said process pipe and securing the first portion of said elastomeric boot,
    (d) a second collar set closely surrounding said penetration sleeve and securing the second portion of said elastomeric boot,
    (e) said first and second collar sets each including radially extending wall portions, with the wall portions of the first collar set overlapping the wall portions of the second collar set in movable relation to accommodate eccentricity and movement of said process pipe in relation to said penetration sleeve, and
    (f) a pressurizing valve connected to said elastomeric boot and extending through one of said collar sets for imparting positive pressures to said chamber,
    (g) said collar sets forming a rigid containment for said elastomeric boot while said chamber is pressurized.

2. An apparatus according to claim 1, further characterized by
    (a) an inflatable clamping ring positioned at each end of said elastomeric boot, between said boot and the surrounding collar set, and
    (b) pressurizing valve means for each of said clamping rings for selectively pressurizing said rings to securely and sealingly clamp the ends of said elastomeric boot to said process pipe and said penetration sleeve.

3. An apparatus according to claim 1, further characterized by
   (a) each of said collar sets being comprised of a plurality of arcuate segments arranged for installation about a previously installed process pipe.

4. An apparatus according to claim 1, further characterized by
   (a) the third portion of said elastomeric boot comprising a generally radial wall positioned adjacent the radially extending wall portions of said collar sets, between said collar sets and said penetration sleeve, and supported by said radially extending wall portions when said chamber is pressurized,
   (b) said generally radial wall being formed with a convolution enabling the first and second portions of said boot to be located on different axes.

5. An apparatus according to claim 3, further characterized by
   (a) said elastomeric boot being of discontinuous annular form to enable application over an installed pipe and having end portions overlapped and adhesively bonded together.

6. An apparatus according to claim 5, further characterized by
   (a) said clamping rings being of discontinuous annular form to enable application over an installed pipe and having end portions overlapped and adhesively bonded together.

7. An apparatus according to claim 4, further characterized by
   (a) the radially extending wall portions of one of said collar sets comprising axially spaced apart arcuate wall panels, and
   (b) the radially extending wall portions of the other of said collar sets being slidably received between axially spaced wall panels of said first collar set.

8. An apparatus according to claim 4, further characterized by
   (a) said collar sets each comprising two sections of generally semi-cylindrical configuration, and
   (b) fastening means for securing together the sections of each said collar set to form a rigid annular structure about said process pipe.

9. An apparatus according to claim 1, further characterized by
   (a) stop means rigidly mounted on said process pipe and engageable with said first collar set to prevent axial movement thereof when said chamber is pressurized.

10. An apparatus for pressure testing a penetration seal between a process pipe and a surrounding penetration sleeve of larger diameter than said process pipe, which comprises
    (a) an elastomeric boot of annular configuration and having overlapping end portions positioned around said process pipe and having its overlapping end portions bonded together,
    (b) said boot having a first portion closely surrounding said process pipe, a second portion closely surrounding a portion of said penetration sleeve, and a third portion joining said first and second portions,
    (c) a first rigid collar set, comprised of a plurality of arcuate sections, mounted in surrounding relation to said elastomeric boot and having a first portion closely surrounding said process pipe and the first portion of said elastomeric boot, and a second portion comprising at least one radially outwardly projecting annular wall,
    (d) a second rigid collar set, comprised of a plurality of arcuate sections, mounted in surrounding relation to said elastomeric boot and having a first portion closely surrounding an end portion of said penetration sleeve and the second portion of said elastomeric collar, and a second portion comprising at least one radially inwardly projecting annular wall,
    (e) said annular walls overlapping each other and together forming an annular end wall structure positioned to support portions of said elastomeric boot,
    (f) a first annular, inflatable clamping ring positioned between said first portion of said first rigid collar set and said first portion of said elastomeric boot for tightly and sealingly clamping said boot portion to said process pipe,
    (g) a second annular, inflatable clamping ring positioned between said first portion of said second rigid collar set and said second portion of said elastomeric boot for tightly and sealingly clamping said boot portion to said penetration sleeve,
    (h) said elastomeric boot, said process pipe, and said penetration sleeve forming a closed chamber with said penetration seal, and
    (i) means for pressurizing said clamping rings and said chamber for testing the integrity of said penetration seal.

11. An apparatus according to claim 10, further characterized by
    (a) rigid stop means on said process pipe for preventing axial movement of said collar sets when said chamber is pressurized.

12. An apparatus according to claim 10, further characterized by
    (a) said annular walls comprising a pair of axially spaced annular walls on one of said collar sets and an annular wall on the other of said collar sets received between said pair of axially spaced annular walls.

* * * * *